UNITED STATES PATENT OFFICE.

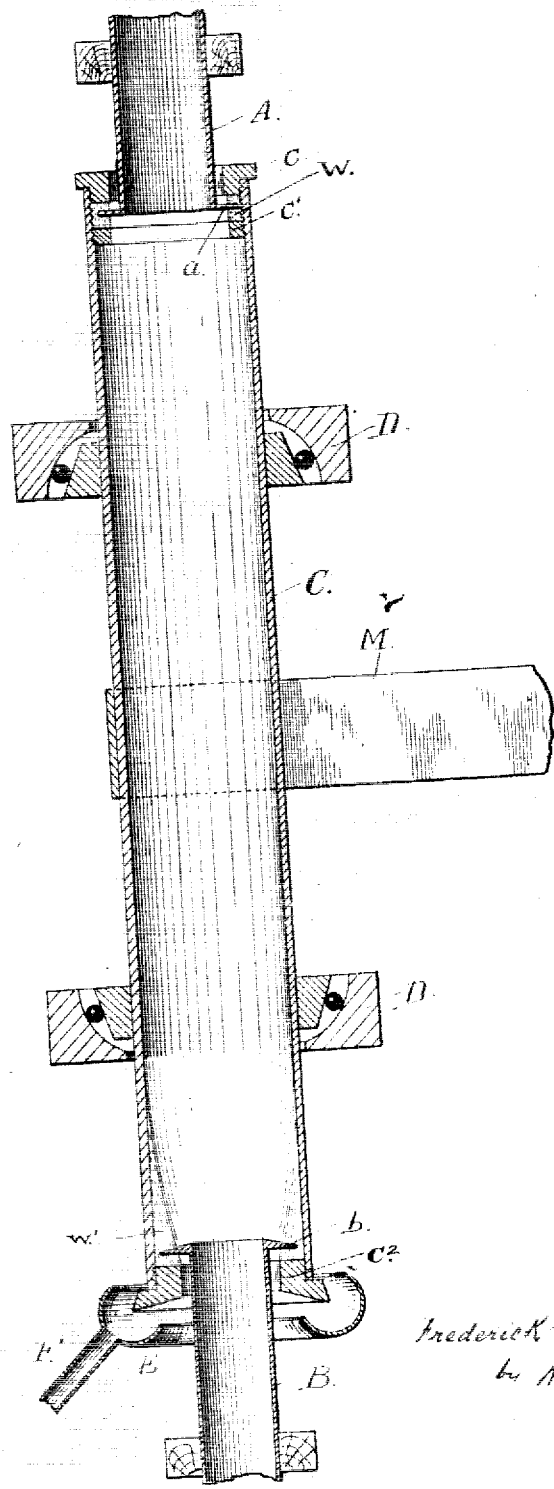

FREDERICK GARDNER COTTRELL, OF BERKELEY, CALIFORNIA, ASSIGNOR OF ONE-HALF TO HARRY EAST MILLER, OF OAKLAND, CALIFORNIA.

MANUFACTURE OF SULFURIC ACID.

No. 866,843.  Specification of Letters Patent.  Patented Sept. 24, 1907.

Application filed January 4, 1906. Serial No. 294,523.

*To all whom it may concern:*

Be it known that I, FREDERICK GARDNER COTTRELL, a citizen of the United States, residing at Berkeley, Alameda county, State of California, have invented certain new and useful Improvements in the Manufacture of Sulfuric Acid; and I hereby declare the following to be a full, clear, and exact description of the same.

My invention relates to the manufacture of sulfuric acid, and especially to that method which involves the direct combination of water with sulfur trioxid, as prepared by the so-called "contact method".

It is well known that when sulfur trioxid in gaseous form, diluted with inert gases such as oxygen and nitrogen, is allowed to bubble through water or dilute sulfuric acid, the originally clear, transparent gas is transformed into a dense white cloud, (that is, a fog or mist) which has proved very difficult to absorb or collect by the ordinary technical methods of gas "scrubbing". This has led to the employment of strong sulfuric acid as an absorbent; but considerable mechanical difficulty has arisen from this in operations on a large scale, chiefly due to the size of the absorbing apparatus required, coupled with the deterioration of the materials of construction.

My invention consists in producing in the contact gases after coming from the contact mass, liquid particles of sulfuric acid representing substantially the whole of the sulfur trioxid formed in said gases by the contact mass, by suitably varying the humidity and temperature of said gases, and, in subsequently separating and collecting the liquid particles of sulfuric acid. My process is distinguished from former practice, in that no attempt is made to directly absorb the gaseous sulfur trioxid; but, on the contrary, the gas is brought in contact with water vapor for the avowed purpose of producing the fog or mist, which most of the existing processes seek, in general, to avoid. The essential and fundamental condition recognized by the present process, whether the contact gases be treated with water in any form, or, as a substitute therefor, dilute sulfuric acid, is that the water or dilute acid will rapidly give off aqueous vapor to the gaseous space, which vapor here unites in the gaseous phase with the sulfur trioxid to form sulfuric acid which is immediately condensed to liquid particles, if the temperature is not too high.

I am aware that the above mentioned fog or mist is attributed by some authorities to the formation of a second modification of the sulfur trioxid itself, rather than to sulfuric acid, on account of its difficulty of absorption in water. However, I consider it much more likely to be largely, at least, made up of sulfuric acid; and this term will be used generically in the present specification to designate the aggregate composition of the mist or fog. All that is here claimed under this term sulfuric acid is also true if part of these particles of mist consist of solid or liquid sulfur trioxid.

If the proportion of aqueous vapor is sufficient to form ordinary sulfuric acid of 100% or less, these particles will have a practically inappreciable vapor tension as regards sulfur trioxid or sulfuric acid, and will only be absorbed by liquids, in so far as they are brought by purely mechanical means into actual contact with them, there being no longer any chance for gaseous diffusion to assist the process. This is the explanation of the failure of the ordinary "scrubber" methods in the case of this mixture.

In carrying out my process, the original gases containing the sulfur trioxid are cooled to a moderate temperature, and are then either bubbled through, led over, or sprayed with water, or with dilute sulfuric acid, to such an extent that the droplets of mist formed will have the desired composition, which in practice will probably be chosen not far from 100% ordinary sulfuric acid. The choice of this composition will depend, among other things, upon the purpose to which the final product is to be put, the uses to which the residual gas is to be put, and questions of resistance of the materials of construction of the apparatus toward acid of varying composition. The fine liquid particles of sulfuric acid which compose the mist are separated and collected in any suitable manner, as, for example, as follows:—The whole mixture, which contains disseminated through it, the sulfuric acid in the form of fine liquid particles, is then subjected to centrifugal action, whereby said particles are separated from said mixture, and can be collected. In order to illustrate this, I show in the accompanying drawing one form of an apparatus in which the mixture may be subjected to centrifugal action, and the fine particles of sulfuric acid separated, collected and discharged.

In the drawing the figure is a vertical section of the apparatus.

A is a pipe to deliver the gases, with suspended mist or fog, to the shell C, which shell has impervious or solid walls and is mounted in suitable bearings D, in order to have imparted to it a rotary motion about its axis, by the application of suitable power, indicated by the belt M.

B is the escape pipe for the gases.

The pipes A and B are held stationary by any suitable means; and, in order to provide a gas tight connection between them and the rotating shell C, there is a liquid seal, which may be briefly described as comprising, at the top, a foot flange $a$ on pipe A, lying between and slightly separated from spaced flanges $c$ and $c'$ on the inner surface $c^t$ the shell C; and, at the bottom, a head flange $b$ on pipe B, lying above and slightly separated from an inner flange $c^2$ on the base of shell C. Into the top of shell C is poured a small quantity of a liquid, which, by the centrifugal action of said shell is maintained as an annular wall, represented by $w$, about and enveloping the foot flange $a$, thereby forming a liquid seal to prevent the gases from escaping. At the bottom, the liquid sulfuric acid, itself, separated and collected from the mixture serves as the seal $w'$, to prevent the escape of the gases, around the outside of the pipe B. The collected sulfuric acid is discharged between the flanges $b$ and $c^2$, and, passing exteriorly to pipe B, is thrown into an encircling trough E, from which it is delivered by a spout F.

The apparatus herein shown, forms no part of the present application and is not herein claimed, as it constitutes the subject matter of a contemporaneous application, Serial Number 294,524, filed January 4, 1906. It is merely illustrative of that part of the present process which involves the separation and collection of the fine particles of sulfuric acid held in suspension in, or disseminated through the gaseous mixture.

The fact taken advantage of in this process is, that just in so far as the sulfur trioxid and sulfuric acid are lost to the molecular forces of diffusion through the gas phase by entering into the liquid phase (suspended droplets), just in so far they become subject to the molar force of centrifugal action, tending to separate them bodily from the residual gases of the mixture. In some cases, at least, the same methods as described here for the formation and collection of the sulfuric acid may, in all probability, do good service in purifying the gases from substances injurious to the platinum contact mass. It is generally accepted that many, if not all, of these "catalyser poisons" tend to condense on the particles of acid, sulfur or other liquids or solids carried mechanically by the contact gases. Assuming this, the above process may incidentally become an important factor in the purification of the gases.

I may state here that the aqueous vapor, as far as this feature of the process is concerned, need not, necessarily, be supplied from a separate source, but may be that, for instance, originally present in the ordinary air drawn into the pyrites or sulfur burners themselves. In this case, a mere cooling of the gases coming from the burners may prove to be all that is required to produce sufficient mist for the purpose of purifying the gases by a centrifugal treatment inserted at this point, i. e. between the burners and the contact substance.

In this connection it should also be noted that, at present, in most of the "contact processes" the air is dried before going to the pyrites or sulfur burners largely to prevent the formation of this mist, and in the pyrite burners themselves, some sulfur trioxid is formed.

From the above it is evident that, in some cases, at least, the necessary hydration of the gases (for purpose of purification) may be attained by simply omitting the drying apparatus before the burners.

It has long been recognized by sulfuric acid manufacturers that when gases containing "white fume" are passed through a centrifugal blower, a very considerable quantity of liquid is precipitated out in the casing of the same. This same principle has been applied to free gases of suspended particles, notably in the iron industry. In these cases, however, the outer containing shell on which the suspended matter is precipitated, remains stationary, and the gas is caused to rotate within it, by the rotation of separate moving parts within. In the present processs, on the other hand, the outer containing shell is itself a part of the rotating system. Where the outer shell is stationary, the speed of rotation of the gas must decrease as the surface of this outer shell is approached and the centrifugal force will thus fall off in this region; whereas in the present process, because of the rotating outer shell, the centrifugal force increases right up to the point where the suspended parts are deposited, that is to say, the periphery of the rotating gaseous mass has, at least, as high an angular velocity as the interior portions. Furthermore, this arrangement reduces the effect of eddy currents, which tend to sweep some of the particles which have been carried part way to the periphery by centrifugal force, back into the body of the gas once more, and thus greatly cut down the efficiency of the operation.

Having thus described my invention, what I claim as new and desire to secure by Letters Patent is—

1. That step in the manufacture of sulfuric acid by the contact method, which consists in producing in the contact gases after coming from the contact mass, liquid particles of sulfuric acid representing substantially the whole of the sulfur trioxid formed in said gases by the contact mass, by suitably varying the humidity and temperature of said gases.

2. That step in the process of obtaining sulfuric acid by the contact method, which consists in converting substantially the whole of the sulfur trioxid formed in the gases by the action of the contact mass, into liquid particles of sulfuric acid, by adding aqueous vapor to the mixture after leaving the contact mass.

3. The process of obtaining sulfuric acid by the contact method, which consists, first, in producing in the contact gases after coming from the contact mass, liquid particles of sulfuric acid representing substantially the whole of the sulfur trioxid formed in said gases by the contact mass, by suitably varying the humidity and temperature of said gases, and, second, in separating and collecting said particles.

4. The process of obtaining sulfuric acid by the contact method, which consists, first, in converting substantially the whole of the sulfur trioxid formed in the gases by the action of the contact mass, into liquid particles of sulfuric acid, by adding aqueous vapor to the mixture after leaving the contact mass, and, second, in separating and collecting said particles.

In witness whereof I have hereunto set my hand.

FREDERICK GARDNER COTTRELL.

Witnesses:
J. COMPTON,
D. B. RICHMAN.